(12) United States Patent
Krig

(10) Patent No.: US 8,649,393 B2
(45) Date of Patent: Feb. 11, 2014

(54) METHOD AND SYSTEM FOR SETTING ALTERNATIVE DEVICE CLASSES WITHIN THE MTP PROTOCOL

(75) Inventor: Scott Krig, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 384 days.

(21) Appl. No.: 12/169,396

(22) Filed: Jul. 8, 2008

(65) Prior Publication Data

US 2009/0059954 A1 Mar. 5, 2009

Related U.S. Application Data

(60) Provisional application No. 60/968,930, filed on Aug. 30, 2007, provisional application No. 61/073,965, filed on Jun. 19, 2008.

(51) Int. Cl.
*H04J 3/22* (2006.01)

(52) U.S. Cl.
USPC ............ 370/466; 370/252; 370/254; 370/469

(58) Field of Classification Search
USPC ............ 370/464, 466, 467, 469, 392; 463/40; 709/203, 217, 232, 220, 227; 358/1.15, 358/435; 710/11; 711/115; 717/168; 348/211.1; 713/1
See application file for complete search history.

(56) References Cited

U.S. PATENT DOCUMENTS

| | | | |
|---|---|---|---|
| 7,493,420 B2 * | 2/2009 | Sadovsky et al. | 710/11 |
| 7,555,554 B2 * | 6/2009 | Manders et al. | 709/227 |
| 7,673,020 B2 * | 3/2010 | Rosenbloom et al. | 709/220 |
| 7,770,165 B2 * | 8/2010 | Olson et al. | 717/168 |
| 2005/0128528 A1 * | 6/2005 | Yamada et al. | 358/435 |
| 2006/0068910 A1 * | 3/2006 | Schmidt et al. | 463/40 |
| 2006/0285155 A1 * | 12/2006 | Yamada et al. | 358/1.15 |
| 2006/0288071 A1 * | 12/2006 | Bigioi et al. | 709/203 |
| 2007/0011264 A1 * | 1/2007 | Rosenbloom et al. | 709/217 |
| 2007/0081486 A1 * | 4/2007 | Koide | 370/328 |
| 2008/0059567 A1 * | 3/2008 | Williams et al. | 709/203 |
| 2008/0059782 A1 * | 3/2008 | Kruse et al. | 713/1 |
| 2008/0304486 A1 * | 12/2008 | Graessley et al. | 370/392 |
| 2008/0307109 A1 * | 12/2008 | Galloway et al. | 709/232 |

OTHER PUBLICATIONS

Building Devices with the MTP Porting Kit, Microsoft Corporation, (http://go.microsoft.com/fwlink/?LinkId=87961), May 1, 2007, pp. 1-8.*

* cited by examiner

*Primary Examiner* — Brian D Nguyen
*Assistant Examiner* — Toan Nguyen
(74) *Attorney, Agent, or Firm* — Brinks Gilson & Lione

(57) ABSTRACT

An MTP/PTP extension may enable MTP/PTP devices to determine which protocol and/or which protocol version to utilize for impending communication. For example protocol and/or protocol version may be requested with a MTP/PTP SetDeviceClass operation that may comprise DeviceClass and/or RequestedVersion parameters. A response to the request may specify a protocol and/or protocol version for impending communication. Moreover, a response may comprise a DeviceInfo dataset comprising one or more fields indicating the protocol and/or protocol version. In various embodiments of the invention, a protocol and/or protocol version may be determined based on a GetDeviceInfo operation. Determination of which protocol and/or which protocol version to utilize for communication between MTP/PTP enabled devices may occur during initiation of communication.

22 Claims, 7 Drawing Sheets

METHOD AND SYSTEM FOR SETTING ALTERNATIVE DEVICE CLASSES WITHIN THE MTP PROTOCOL

CROSS-REFERENCE TO RELATED APPLICATIONS/INCORPORATION BY REFERENCE

This application makes reference to and claims priority to U.S. Provisional Application Ser. No. 60/968,930, filed on Aug. 30, 2007, entitled "METHOD AND SYSTEM FOR CONFIGURING ALTERNATIVE DEVICE CLASS SETTINGS WITHIN MEDIA TRANSFER PROTOCOL (MTP)," which is hereby incorporated herein by reference in its entirety.

This application makes reference to and claims priority to U.S. Provisional Application Ser. No. 61/073,965, filed on Jun. 19, 2008, entitled "METHOD AND SYSTEM FOR CONFIGURING ALTERNATIVE DEVICE CLASSES WITHIN THE MTP PROTOCOL," which is hereby incorporated herein by reference in its entirety.

FIELD OF THE INVENTION

Certain embodiments of the invention relate to multimedia communication. More specifically, certain embodiments of the invention relate to a method and system for setting alternative device classes within the MTP protocol.

BACKGROUND OF THE INVENTION

The media transfer protocol (MTP) specification was created as an extension to the picture transfer protocol (PTP) for media devices. MTP and PTP may enable communication via transient connections between media devices and/or storage devices. In this regard, MTP and PTP may enable an exchange of content. In addition, MTP and/or PTP may facilitate remote command and control of a connected device. A plurality of devices may utilize MTP and/or PTP, for example, digital still cameras, portable media players and cellular phones.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for setting alternative device classes within the MTP protocol, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for setting alternative device classes within the MTP protocol. Aspects of the invention may comprise a pair of devices that may be enabled to communicate via Media Transfer Protocol (MTP) and/or Picture Transfer Protocol (PTP). In this regard, one of the devices may act as an MTP or PTP initiator and another device may act as an MTP or PTP responder. For example, a personal computer may function as the MTP initiator device and a mobile phone or handheld digital media device may function as the MTP responder device. However, the invention is not limited with regard to any specific type of device and may embody any suitable device enabled to communicate via MTP and/or PTP protocols. Accordingly, an extension of MTP/PTP may enable determination of which protocol and/or which protocol version to utilize for communication between the MTP/PTP enabled devices. As a result, the devices may communicate based on the determination. In this manner, a MTP/PTP SetDeviceClass operation that may comprise one or more parameters such as DeviceClass and RequestedVersion may be utilized to request a specified protocol and/or protocol version for impending communication between the MTP/PTP devices. A response to the request may specify a protocol and/or protocol version for the impending communication. Moreover, a response may comprise a DeviceInfo dataset comprising one or more fields that may determine which protocol and/or protocol version to utilize for the impending communication. In various embodiments of the invention, a GetDeviceInfo operation may be utilized to determine which protocol and/or protocol version to utilize for impending communication. A determination of which protocol and/or which protocol version to utilize for communication between MTP/PTP enabled devices may occur during initiation of communication.

Figure 1:
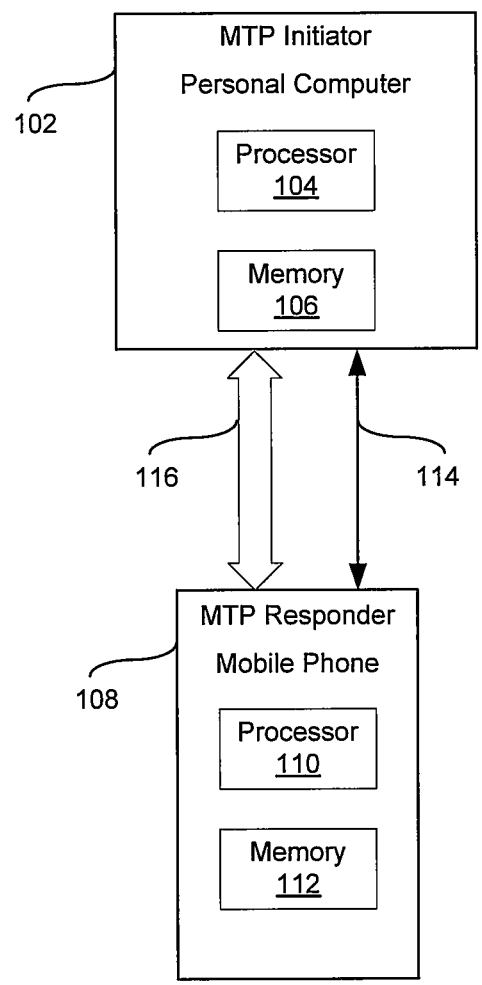
FIG. 1 is a block diagram that illustrates exemplary devices that may be enabled to determine utilization of MTP or PTP communication protocol and/or protocol version.

FIG. 1 is a block diagram that illustrates exemplary devices that may be enabled to determine utilization of MTP or PTP communication protocol and/or protocol version. Referring to FIG. 1, there is shown a personal computer 102, a processor 104, a memory 106, a MTP responder device 108, a processor 110, a memory 112, a communication link 114 and the MTP and/or PTP protocols 116.

The personal computer 102 may comprise suitable logic, circuitry and/or code to enable storage and/or distribution of data to various devices utilizing MTP and/or PTP protocols. For example, the processor 104 and memory 106 may enable storage and/or distribution of media data. The personal computer 102 may for example, distribute media content to the MTP responder device 108 or to a digital media player. The personal computer 102 may be communicatively coupled via the communication link 114 with the MTP responder device 108.

The MTP responder device 108 may comprise suitable logic, circuitry and/or code to communicate with the personal computer 102 utilizing MTP and/or PTP protocols. The MTP responder device 108 may comprise the processor 110 and the memory 112 that may enable storage and/or management of media data. The MTP responder device 108 may exchange media data with the personal computer 102 via the communication link 114.

The communication link 114 may comprise suitable logic, circuitry and/or code to communicatively couple the computer 102 and the MTP responder device 108 based on wireless or line connectivity. The communication link 114 may support communication between the personal computer 102 and the MTP responder device 108 based on MTP and/or PTP protocols. In some embodiments of the invention, connectivity between the personal computer 102 and the MTP responder device 108 may be established for the duration of a task or exchange of data and may be released.

The MTP and/or PTP protocols 116 enables transfer of media content between various devices such as the personal computer 102 and the MTP responder device 108 via the communication link 114. In some embodiments of the invention, connectivity via the MTP and/or PTP protocols 116 between the personal computer 102 and MTP responder device 108 may be established for the accomplishment of a task such as an exchange of data and may be released once the task is complete. Devices communicating via MTP and/or PTP protocols 116 may act as an initiator or a responder wherein the initiator may be a device to first communicate to a responder. For example, the initiator may send to the responder an operation comprising operation parameter values and an indication of expected response codes, data transactions and/or response parameters. The responder may return the appropriate response code, data and/or response parameter values. In accordance with an embodiment of the invention the MTP and/or PTP protocols 116 may be enhanced to enable devices to determine which protocol, MTP or PTP and which version of the protocol to utilize prior to and/or during an exchange of information.

In operation, the MTP and/or PTP protocols 116 may comprise modified specifications within the MTP and/or PTP architecture. For example an initiator such as the personal computer 102 may send an operation that may be named SetDeviceClass to the responder, for example, the MTP responder device 108. The SetDeviceClass operation may instruct the responder to configure itself to a requested DeviceClass, for example, either as an MTP device or a PTP device according to Table 1. The responder may support PTP and/or MTP stacks.

TABLE 1

SetDeviceClass Operation Utilizing DeviceInfo Dataset

| | |
|---|---|
| Operation Code | 0xXXXX |
| Operation Parameter 1 | DeviceClass |
| Operation Parameter 2 | RequestedVersion |
| Operation Parameter 3 | None |
| Operation Parameter 4 | None |
| Operation Parameter 5 | None |
| Data | DeviceInfo dataset |
| Data Direction | R->I |
| ResponseCode Options | OK, Parameter__Not__Supported, Operation__Not__Supported, Device__Class__Not__Supported |
| Response Parameter 1 | None |
| Response Parameter 2 | None |
| Response Parameter 3 | None |
| Response Parameter 4 | None |
| Response Parameter 5 | None |

When the SetDeviceClass operation is received by the responder, the responder may return a valid DeviceInfo dataset to the initiator indicating which DeviceClass may be currently loaded in the responder as well as device capabilities. This Operation may be called at any time during an open session. This operation may also be used outside of a session. When used outside a session, both a SessionID and a TransactionID in the operation request dataset may be set to 0x00000000. In addition, this operation may be used by an initiator instead of GetDeviceInfo.

The DeviceClass parameter shown in Table 1 corresponding to Operational Parameter 1 may indicate which protocol MTP or PTP is being requested by the initiator. The Initiator may request one of the DeviceClass types shown in Table 2.

TABLE 2

DeviceClass Operational Parameter

| Value | Description |
|---|---|
| 0x00000000 | MTP stack |
| 0x00000001 | PTP stack |

In instances where the desired DeviceClass is not supported by the responder, the responder may return the DeviceInfo dataset of the currently loaded stack, for example MTP or PTP and may also return the Device_Class-Not_Supported Response code.

The RequestedVersion parameter shown in Table 1 corresponding to Operational Parameter 2 may indicate which version of either MTP or PTP protocol the initiator is requesting to be loaded by the responder. However, the responder may ignore the RequestedVersion number and may load any version of the requested stack. The RequestedVersion parameter may have the same format as the StandardVersion field of the DeviceInfo dataset as shown in Table 3. In instances where the RequestedVersion parameter is not used, it may be set to 0x00000000.

TABLE 3

RequestedVersion Operational Parameter

| Parameter | Size (bytes) | Format |
|---|---|---|
| Requested Version | 4 | UINT32 *Note: the StandardVersion only occupies the lower UINT16 of this field. |

The Initiator may examine the returned DeviceInfo dataset StandardVersion field to learn the version actually loaded by the responder as shown in table 4. For PTP, the standard version may be a value in hundredths. For MTP the standard version may comprise the value 100.

TABLE 4

DeviceInfo Dataset

| Dataset field | Field order | Size (bytes) | Datatype |
|---|---|---|---|
| Standard Version | 1 | 2 | UINT16 |
| MTP Vendor Extension ID | 2 | 4 | UINT32 |
| MTP Version | 3 | 2 | UINT16 |
| MTP Extensions | 4 | Variable | String |
| Functional Mode | 5 | 2 | UINT16 |
| Operations Supported | 6 | Variable | Operation Code Array |
| Events Supported | 7 | Variable | Event Code Array |
| Device Properties Supported | 8 | Variable | Device Property Code Array |
| Capture Formats | 9 | Variable | Object Format Code Array |
| Playback Formats | 10 | Variable | Object Format Code Array |
| Manufacturer | 11 | Variable | String |
| Model | 12 | Variable | String |
| Device Version | 13 | Variable | String |
| Serial Number | 14 | Variable | String |
| Dataset field | Field order | Size (bytes) | Datatype |

In addition, there may be alternative methods to determine which protocol MTP or PTP and/or which protocol version may be utilized for communication between the personal computer 102 and the MTP responder device 108. In an exemplary embodiment of the invention, a SetDeviceClass operation may be sent from the initiator such as the personal computer 102 to the responder such as the MTP responder device 108. However, rather than returning a DeviceInfo dataset, the responder may return DeviceClass and Version response parameters that indicate which protocol stack is loaded in the responder, shown in Table 5. The returned DeviceClass and/or Version may be the same or different from what was requested by the initiator.

TABLE 5

DeviceClass Operation Utilizing DeviceClass and Version Response Parameters

| Operation Code | 0xXXXX |
|---|---|
| Operation Parameter 1 | DeviceClass |
| Operation Parameter 2 | RequestedVersion |
| Operation Parameter 3 | None |
| Operation Parameter 4 | None |
| Operation Parameter 5 | None |
| Data | None |
| Data Direction | None |
| ResponseCode Options | OK, Parameter_Not_Supported, Operation_Not_Supported, Device_Class_Not_Supported |
| Response Parameter 1 | DeviceClass |
| Response Parameter 2 | Version |
| Response Parameter 3 | None |
| Response Parameter 4 | None |
| Response Parameter 5 | None |

In another exemplary embodiment of the invention, an alternative method may be utilized for determining which protocol, MTP or PTP, and/or which protocol version may be utilized for communication between the personal computer 102 and the MTP responder device 108. In this regard, a GetDeviceInfo operation may be sent by the initiator to the responder without any response parameters. The responder may return its DeviceInfo dataset, shown in Table 4. Subsequently, the initiator may communicate via the protocol stack and version indicated in the DeviceInfo dataset or may send a SetDeviceClass operation to the responder to change the DeviceClass and version as shown in Table 1.

TABLE 6

GetDeviceInfo

| Operation Code | 0x1001 |
|---|---|
| Operation Parameter 1 | None |
| Operation Parameter 2 | None |
| Operation Parameter 3 | None |
| Operation Parameter 4 | None |
| Operation Parameter 5 | None |
| Data | DeviceInfo dataset |
| Data Direction | R->I |
| ResponseCode Options | OK, Parameter_Not_Supported |
| Response Parameter 1 | None |
| Response Parameter 2 | None |
| Response Parameter 3 | None |
| Response Parameter 4 | None |
| Response Parameter 5 | None |

The GetDeviceInfo operation may be called outside of a session or during an open session. When used outside a session, both the SessionID and TransactionID in the OperationRequest dataset must be 0x00000000.

Figure 2:
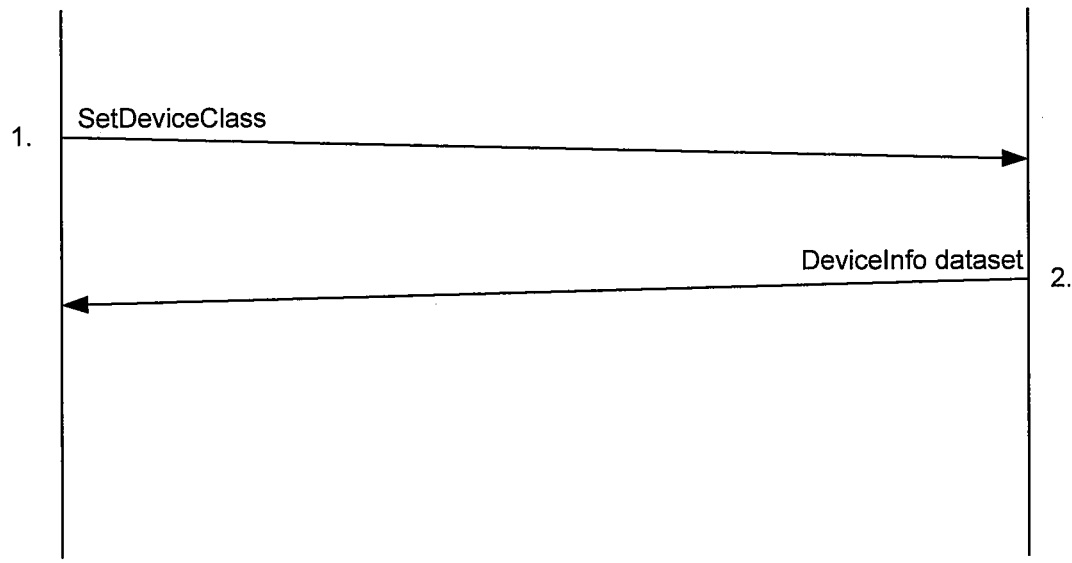
FIG. 2 is a flow diagram that illustrates an exemplary SetDeviceClass operation utilizing DeviceInfo dataset for determining which protocol and/or protocol version to utilize for communication between an MTP or PTP initiator and responder, in accordance with an embodiment of the invention.

FIG. 2 is a flow diagram that illustrates an exemplary SetDeviceClass operation utilizing DeviceInfo dataset for determining which protocol and/or protocol version to utilize for communication between an MTP or PTP initiator and responder, in accordance with an embodiment of the invention. Referring to FIG. 2, the SetDeviceClass operation may be utilized to request a protocol and/or version for communication between an initiator 102 and MTP responder device 108. The MTP or PTP initiator 102 may be a personal computer and the MTP responder device 108 may be a mobile phone, for example. In step 1, the MTP or PTP initiator 102 may send a SetDeviceClass operation to the MTP responder device 108. In step 2, the MTP responder device 108 may return a DeviceInfo dataset.

Figure 3:
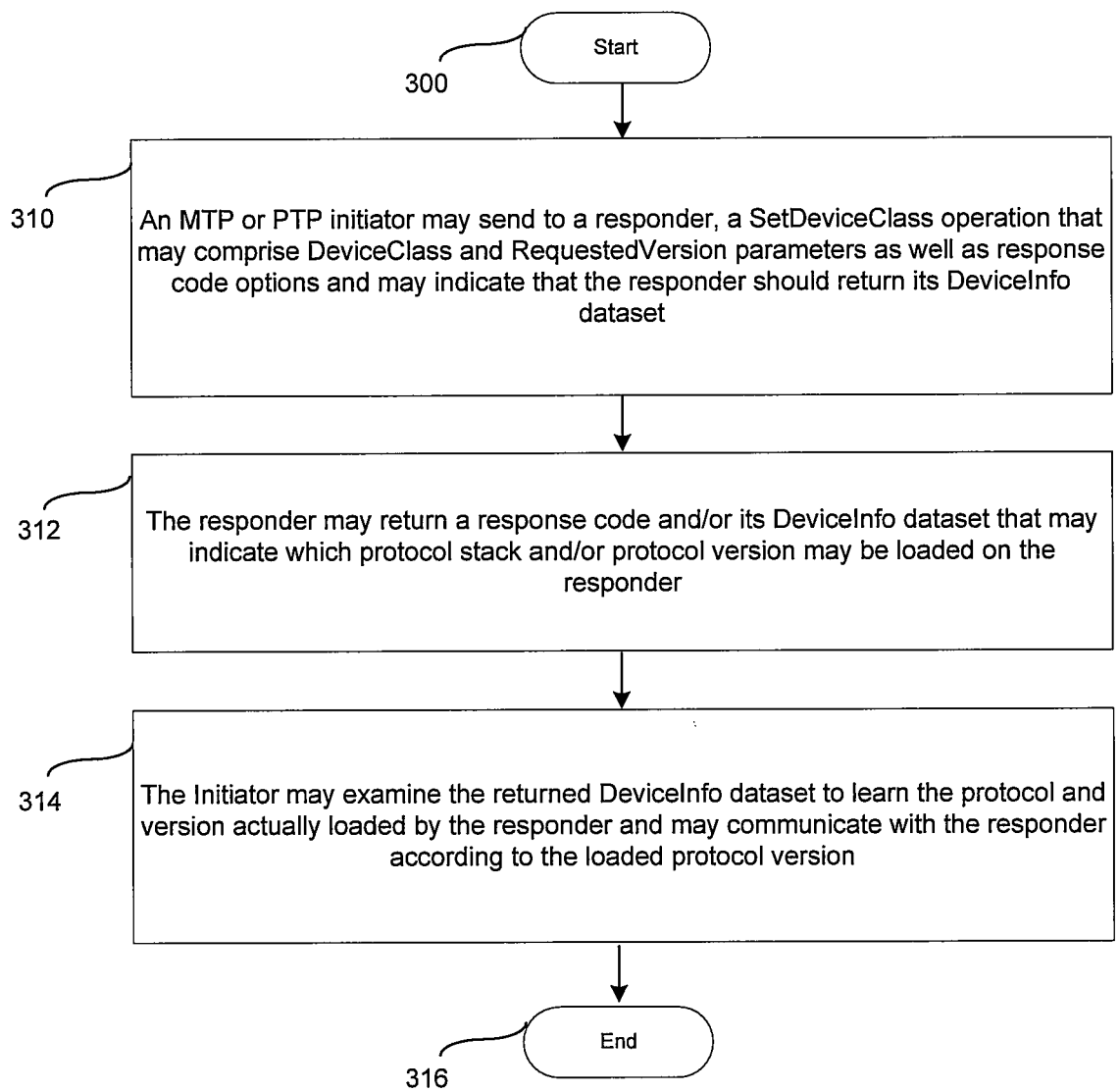
FIG. 3 is a flow chart that illustrates exemplary steps for utilizing SetDeviceClass operation with DeviceInfo dataset for determining a protocol and/or protocol version for MTP or PTP communication, in accordance with an embodiment of the invention.

FIG. 3 is a flow chart that illustrates exemplary steps for utilizing SetDeviceClass operation with DeviceInfo dataset for determining a protocol and/or protocol version for MTP or PTP communication, in accordance with an embodiment of the invention. Referring to FIG. 3, the step 300 may be a start step. In step 310, an MTP or PTP initiator, for example the personal computer 102 may send to a responder, for example the MTP responder device 108, a SetDeviceClass operation that may comprise DeviceClass and RequestedVersion parameters as well as response code options and may indicate that the responder, MTP responder device 108, should return its DeviceInfo dataset to the initiator, personal computer 102. In step 312, the MTP responder device 108, may return a response code and/or its DeviceInfo dataset that may indicate which protocol stack and protocol version may be loaded on the MTP responder device 108. In step 314, the initiator, personal computer 102, may examine the returned DeviceInfo dataset to learn the protocol and version actually loaded by the MTP responder device 108, and may communicate with the MTP responder device 108, according to the loaded protocol version. Step 316 may be the end of exemplary steps.

Figure 4:
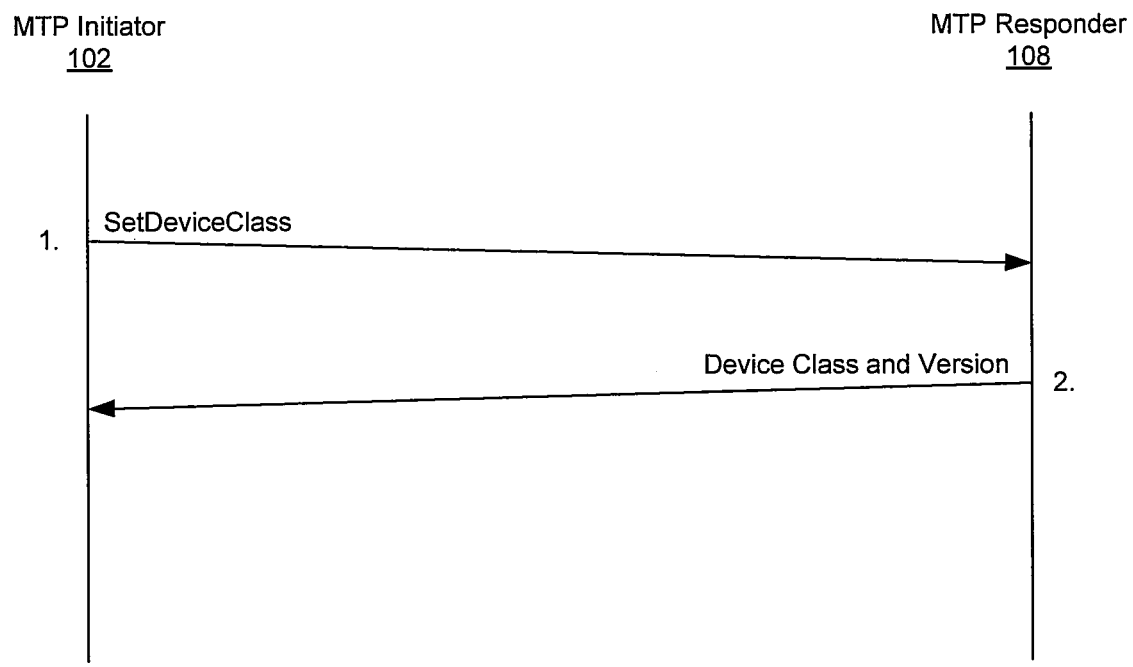
FIG. 4 is a flow diagram that illustrates an exemplary SetDeviceClass operation utilizing DeviceClass and/or Version response parameters for determining which protocol and/or protocol version to utilize for communication between an MTP or PTP initiator and responder, in accordance with an embodiment of the invention.

FIG. 4 is a flow diagram that illustrates an exemplary SetDeviceClass operation utilizing DeviceClass and/or Version response parameters for determining which protocol and/or protocol version to utilize for communication between an MTP or PTP initiator and responder, in accordance with an embodiment of the invention. Referring to FIG. 4, the SetDeviceClass operation may be utilized to request a protocol and/or version for communication between an MTP initiator device 102 and MTP responder device 108. The MTP or PTP initiator device 102 may be a personal computer and the MTP responder device 108 may be a mobile phone, for example. In step 1, the MTP or PTP initiator device 102 may send a SetDeviceClass operation to the MTP responder device 108. In step 2, the MTP responder device 108 may return a Device Class and Version response parameters.

Figure 5:
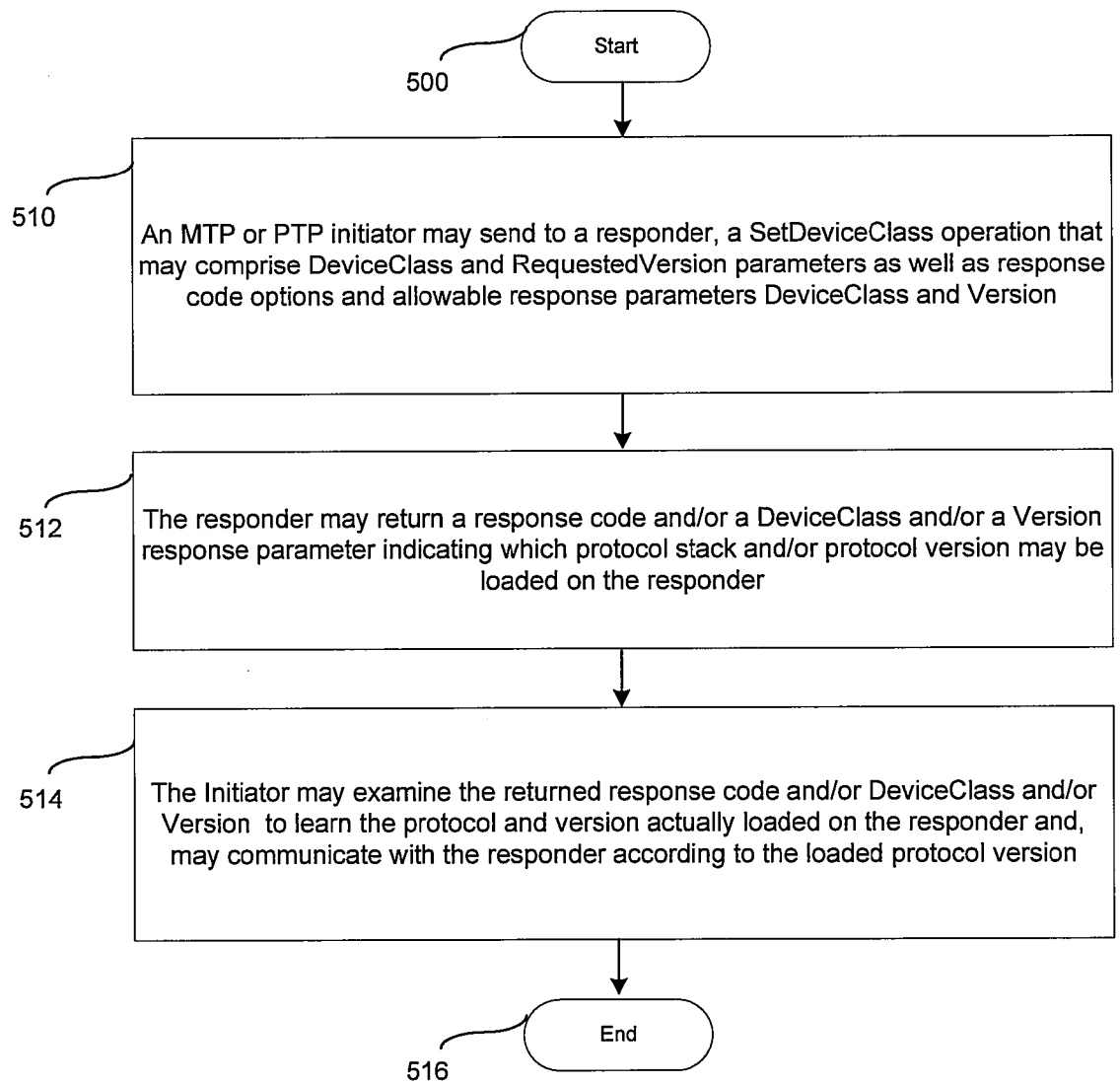
FIG. 5 is a flow chart that illustrates exemplary steps for utilizing SetDeviceClass operation with DeviceClass and/or Version response parameters for determining a protocol and/or protocol version for MTP or PTP communication, in accordance with an embodiment of the invention.

FIG. 5 is a flow chart that illustrates exemplary steps for utilizing SetDeviceClass operation with DeviceClass and/or Version response parameters for determining a protocol and/or protocol version for MTP or PTP communication, in accordance with an embodiment of the invention. Referring to FIG. 5, the step 500 may be a start step. In step 510, an MTP or PTP initiator, for example the personal computer 102 may send to a responder, for example the MTP responder device 108, a SetDeviceClass operation that may comprise DeviceClass and RequestedVersion parameters as well as response code options and may indicate that the MTP responder device 108, should return its DeviceClass and/or Version response parameters to the initiator, personal computer 102. In step 512, the MTP responder device 108, may return a response code and/or its DeviceClass and/or Version response parameters that may indicate which protocol stack and protocol version may be loaded on the MTP responder device 108. In step 514, the initiator, personal computer 102, may examine the returned DeviceClass and/or Version response parameters to learn whether the protocol and version actually loaded by the MTP responder device 108, and may communicate with the MTP responder device 108, according to the loaded protocol version. Step 516 may be the end of exemplary steps.

Figure 6:
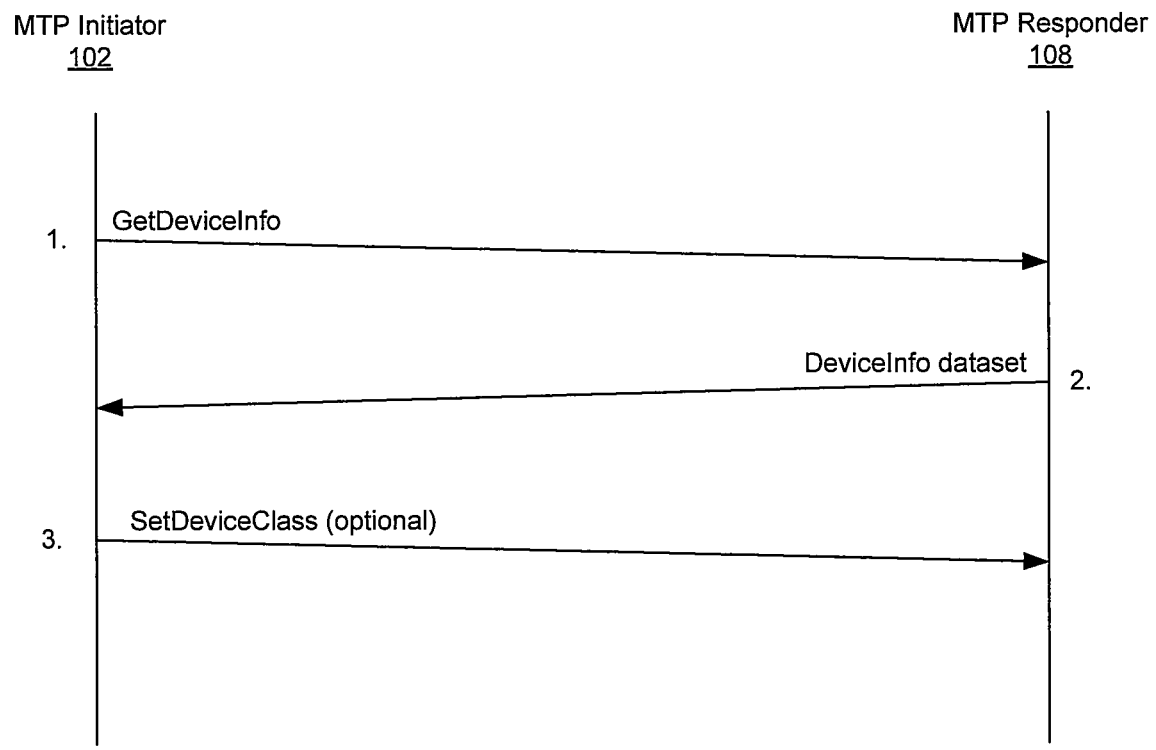
FIG. 6 is a flow diagram that illustrates an exemplary GetDeviceInfo operation and optional SetDeviceClass operation for determining which protocol and/or protocol version to utilize for communication between an MTP or PTP initiator and responder, in accordance with an embodiment of the invention.

FIG. 6 is a flow diagram that illustrates an exemplary GetDeviceInfo operation and optional SetDeviceClass operation for determining which protocol and/or protocol version to utilize for communication between an MTP or PTP initiator and responder, in accordance with an embodiment of the invention. Referring to FIG. 6, the GetDeviceInfo operation may be utilized to determine a protocol and/or version for communication between an initiator 102 and MTP responder device 108. The MTP or PTP initiator 102 may be a personal computer and the MTP responder device 108 may be a mobile phone, for example. In step 1, the MTP or PTP initiator device 102 may send a GetDeviceInfo operation to the MTP responder device 108. In step 2, the MTP responder device 108 may return a DeviceInfo dataset. In step 3, the MTP or PTP initiator 102 may optionally send a SetDeviceServiceClass operation based on information received in the DeviceInfo dataset.

Figure 7:
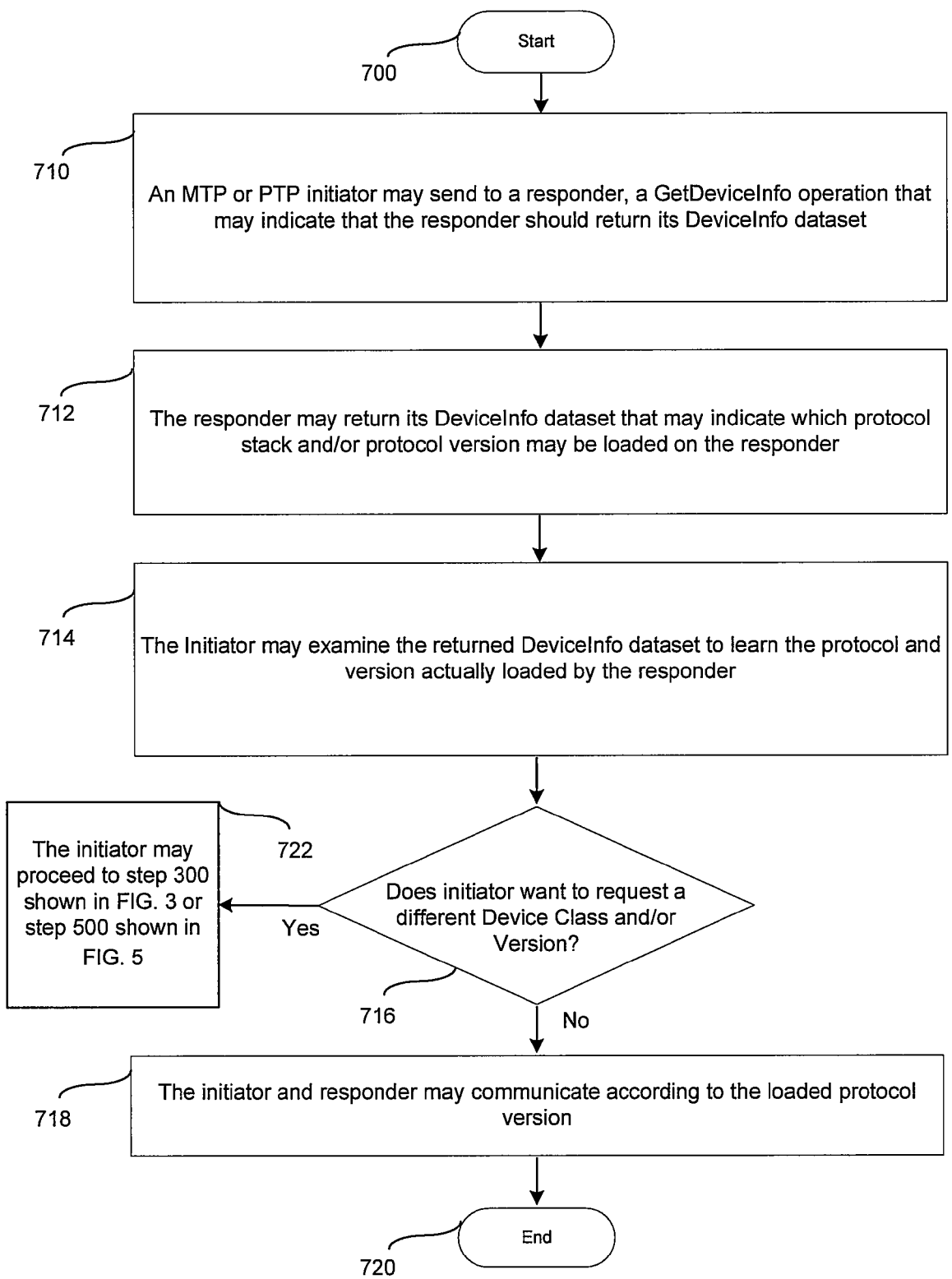
FIG. 7 is a flow chart that illustrates exemplary steps for utilizing GetDeviceInfo operation and optional SetDeviceClass operation for determining a protocol and/or protocol version for MTP or PTP communication, in accordance with an embodiment of the invention.

FIG. 7 is a flow chart that illustrates exemplary steps for utilizing GetDeviceInfo operation and optional SetDeviceClass operation for determining a protocol and/or protocol version for MTP or PTP communication, in accordance with an embodiment of the invention. Referring to FIG. 7, the step 700 may be a start step. In step 710, an MTP or PTP initiator, for example the personal computer 102 may send to a responder, for example the MTP responder device 108, a GetDeviceInfo operation and may indicate that the MTP responder device 108, should return its DeviceInfo dataset to the initiator, personal computer 102. In step 712, the MTP responder device 108, may return its DeviceInfo dataset that may indicate which protocol stack and/or protocol version may be loaded on the MTP responder device 108. In step 714, the initiator, personal computer 102, may examine the returned DeviceInfo dataset to learn the protocol and version actually loaded by the MTP responder device 108. In step 716, if the initiator, personal computer 102 does not want to request a different DeviceClass and/or Version, proceed to step 718. In step 718, the initiator and responder may communicate according to the loaded protocol version. Step 720 may be the end of exemplary steps. In step 716, if the initiator, personal computer 102 wants to request a different DeviceClass and/or Version, proceed to step 300 in FIG. 3 or step 500 in FIG. 5 for example.

In an embodiment of the invention, an extension of Media Transfer Protocol (MTP) and/or Picture Transfer Protocol (PTP) may enable determination of which protocol and/or which protocol version to utilize for communication between MTP/PTP enabled devices 102 and 108. As a result, the devices 102 and 108 may communicate based on the determination. In this manner, a MTP/PTP SetDeviceClass operation that may comprise one or more parameters such as DeviceClass and RequestedVersion may be utilized to request a specified protocol or protocol version for impending communication between the devices 102 and 108. A response to the request may specify a protocol and/or protocol version for the impending communication. Moreover, the response may comprise a DeviceInfo dataset comprising one or more fields that may determine which protocol and/or protocol version to utilize for the impending communication. In various embodiments of the invention, a GetDeviceInfo operation may be utilized to determine which protocol and/or protocol version to utilize for impending communication. A determination of which protocol and/or which protocol version to utilize for communication between MTP/PTP enabled devices 102 and 108 may occur during initiation of communication.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for setting alternative device classes within the MTP protocol.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method, comprising:
sending via an initiator device, a first request to a responder device for first device information including an identification of a first protocol stack of a first media transfer protocol loaded on the responder device and an identification of a second media transfer protocol compatible with the responder device;
receiving a first response from the responder device including the first device information;
making a determination from the first response whether to use the second media transfer protocol;
communicating with the responder device via the first media transfer protocol, when the determination from the first response is to not request the second media transfer protocol; and
when the determination from the first response is to request the second media transfer protocol:
sending a second request to the responder device to load a second protocol stack for the second media transfer protocol on the responder device;
sending a third request to the responder device for confirmation that the second protocol stack is loaded; and
after receiving the confirmation, communicating with the responder device via the second media transfer protocol.

2. The method of claim 1, further comprising:
sending a fourth request to the responder device for the responder device to communicate via the second media transfer protocol.

3. The method of claim 2, further comprising:
receiving a third response from the responder device that the responder device is ready to communicate via the second media transfer protocol.

4. The method of claim 3, further comprising:
communicating with the responder device via the second media transfer protocol, when the third response is received by the initiator device.

5. The method of claim 1, wherein the second media transfer protocol and the first media transfer protocol are different versions of a picture transfer protocol (PTP).

6. The method of claim 1, wherein the first request to the responder device for first device information includes a media transfer protocol (MTP) operation that retrieves MTP version information about an MTP media transfer protocol version available on the responder device.

7. A method, comprising:
receiving at a responder device, a first request from an initiator device for first device information including an identification of a first protocol stack of a first media transfer protocol loaded on the responder device and an identification of a second media transfer protocol compatible with the responder device;
sending a first response to the initiator device including the first device information;
receiving a second request from the initiator device to load a second protocol stack of the second media transfer protocol on the responder device;
receiving a third request from the initiator device for second device information including an identification of the second protocol stack loaded on the responder device;
sending a second response to the initiator device including the second device information; and
communicating with the initiator device via the second media transfer protocol.

8. The method of claim 7, further comprising: receiving a fourth request from the initiator device to change the first media transfer protocol to the second media transfer protocol, when the first media transfer protocol is not acceptable to the initiator device.

9. The method of claim 7, wherein communication with the responder device is established for a duration of a task.

10. The method of claim 7, further comprising:
sending a third response to the initiator device that the responder device is ready to communicate via the second media transfer protocol.

11. The method of claim 10, wherein the communicating with the initiator device via the second media transfer protocol includes transferring media files, objects, or data.

12. The method of claim 7, wherein the second media transfer protocol and the first media transfer protocol are different versions of picture transfer protocol (PTP).

13. The method of claim 7, wherein the first request for first device information includes a media transfer protocol (MTP) operation that retrieves information associated with an MTP version used by the responder device.

14. An electronic device, comprising:
a processor, a memory, and instructions stored in the memory that are operable to:
send a first request to a responder device for first device information including an identification of a first protocol stack of a first version of a media transfer protocol (MTP) loaded on the responder device and an identification of a second version of the MTP compatible with the responder device;
receive a first response from the responder device including the first device information;
make a determination from the first response whether to request the responder device to use the second version of the MTP;
communicate with the responder device via the first version of the MTP, when the determination from the first response is to not to request the responder device to use the second version of the MTP; and
when the determination from the first response is to request the responder device to use the second version of the MTP, the instructions are further operable to:
send a second request to the responder device to load a second protocol stack for the second version of the MTP on the responder device;
send a third request to the responder device for confirmation that the second protocol stack is loaded; and after receiving the confirmation, communicate with the responder device via the second version of the MTP.

15. The device of claim 14, wherein the instructions stored in the memory are further operable to:
send a fourth request to the responder device for the responder device to use the second version of the MTP.

16. The device of claim 15, further operable to:
receive a third response from the responder device that the responder device is ready to communicate via the second version of the MTP.

17. The device of claim 16, wherein the instructions stored in the memory are further operable to:
communicate with the responder device via the second version of the MTP, when the third response is received by the electronic device.

18. The device of claim 14, wherein communication with the responder device includes transferring media files, objects, or data.

19. The device of claim 14, wherein the second and the first versions of the MTP are extensions of a picture transfer protocol (PTP).

20. The device of claim 14, wherein the first request to the responder device for first device information includes a MTP operation.

21. The device of claim 14, wherein communication with the responder device is established for a duration of a task.

22. The device of claim 14, wherein communication with the responder device is established for a duration of a data exchange.

* * * * *